United States Patent
Hummel

(10) Patent No.: US 6,326,778 B1
(45) Date of Patent: Dec. 4, 2001

(54) METHOD AND APPARATUS FOR TRANSMITTING SPEED INFORMATION AND OTHER ADDITIONAL INFORMATION DETECTED BY A SENSING DEVICE

(75) Inventor: Ulrich Helmut Hummel, Teningen (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/270,961

(22) Filed: Mar. 16, 1999

(30) Foreign Application Priority Data

Mar. 16, 1998 (DE) ................................. 198 11 095

(51) Int. Cl.$^7$ ........................................... G01P 3/48
(52) U.S. Cl. ............... 324/173; 324/166; 324/207.2; 318/254
(58) Field of Search ................... 324/173, 207.2, 324/327, 166, 168; 318/254, 138, 439, 802, 471

(56) References Cited

U.S. PATENT DOCUMENTS

| 5,319,291 | * | 6/1994 | Ramirez | 318/254 |
| 5,459,405 | * | 10/1995 | Wolf et al. | 324/644 |
| 5,723,957 | * | 3/1998 | Ishikawa | 318/254 |
| 5,859,510 | * | 1/1999 | Dolan et al. | 318/254 |

FOREIGN PATENT DOCUMENTS

| 26 04 599 A1 | 11/1977 | (DE) . |
| 0 766 088 A1 | 2/1997 | (DE) . |
| WO 97/08674 | 6/1997 | (WO) . |
| WO 98/09173 | 5/1998 | (WO) . |

* cited by examiner

Primary Examiner—Safet Metjahic
Assistant Examiner—Subhash Zaveri
(74) Attorney, Agent, or Firm—Foley, Hoag & Eliot LLP

(57) ABSTRACT

A method and a sensing device transmit speed information and additional information over a transmission channel. For this purpose, the transmission clock cycle is selected to reflect the speed and is detected by the sensing device. The additional information is transmitted as a modulation of the transmission clock cycle.

27 Claims, 3 Drawing Sheets

METHOD AND APPARATUS FOR TRANSMITTING SPEED INFORMATION AND OTHER ADDITIONAL INFORMATION DETECTED BY A SENSING DEVICE

BACKGROUND OF THE INVENTION

1. Field of the Invention

The invention relates to a method and apparatus for transmission of data and more particularly to a method and apparatus for transmitting speed information and other information detected by a sensing device.

2. Description of Related Art

Sensing devices that detect the speed of a moving object (rotary movement or linear movements) and transmit the information about the detected speed as well as additional information such as temperature, switching behavior, and direction of movement, to a control device, can transmit this information in various ways, which all tend to have certain problems associated therewith.

All of the information, i.e., the detected speed and the additional information detected, can be transmitted in parallel. This approach, however, requires additional lines and connections to the sensing device. The additional lines and terminals add to the cost and affect the reliability both during manufacture and operation. The additional lines and contact terminals on the sensing device and the internal wiring required inside a semiconductor chip in which such sensing devices are integrated, can result in EMI or EMV interference.

Another approach for transmitting the afore-mentioned information uses a very fast serial data protocol. In this approach, the speed information and the additional information are transmitted sequentially. In comparison to parallel transmission, no additional lines or contact terminals on the sensing device are required. The data protocol, however, must be transmitted relatively fast so that all the information is transmitted within an acceptable time.

Yet another approach for overcoming the disadvantages uses a so-called multilevel analog transmission. This transmission of the information, however, requires an extremely accurate calibration of the sensing device and/or an extremely accurate measurement. Problems with this transmission technology can arise, particularly if the sensing device is subjected to severe temperature fluctuations.

It is therefore desirable to provide a method of the type described above which is much simpler and much less susceptible to errors than the conventionally employed transmission methods. The method may also allow a relatively low-frequency serial data transmission over two-wire lines. It would also be desirable to provide a sensing device for carrying out such a transmission method.

SUMMARY OF THE INVENTION

According to the present invention, a transmission clock cycle is selected as a function of speed detected by a sensing device and additional information is transmitted as a modulation of the transmission clock cycle.

In order to be able to select the transmission clock cycle as a function of the speed detected by the sensing device, code information may advantageously be applied to the movable object that is monitored by the sensor, at regular intervals on the side that is scanned by the sensing device. This code information may be scanned and evaluated by the sensing device used to measure the speed. In the simplest case, the code information may be in the form of colored bars arranged at regular intervals on the object to be moved. Other forms of code information are also possible. For example, the teeth and gaps of gears or racks may be used to provide code information. Depending on how fast the moving object moves or turns, the code elements of the code information move faster or slower past the sensor of the sensing device, which may be detected by the sensor device to evaluate the speed.

The detection signal that is produced when the code elements move past the sensor of the sensing device may advantageously be supplied to a threshold value discriminator to derive from the detection signal an unambiguous square-wave signal. This square-wave signal may then provide the transmission clock cycle for the additional information. For example, the additional information could be the temperature or the switching behavior of the sensor. The direction of movement may also be transmitted to a control device as additional information. According to the invention, this additional information may be transmitted as modulation of the transmission clock cycle.

Advantageously, the modulation may be performed by binary data bits, with one data bit being transmitted between the individual edges of the transmission clock pulses.

Optical, inductive, and magnetic sensors may be used as sensors of the sensing device. The code information, or the code elements applied as code information to the object to be moved, may depend on the type of the selected sensor.

According to another advantageous feature of the invention, the sensing device may have one or more Hall sensors which detect the movement of teeth and gaps as they pass during the movement of the rack or gear. The consecutive tooth edges may be detected and the resultant cycle signal may be transmitted almost without any time delay to a control device which generates a transmission clock pulse that corresponds to the passing edges. If the teeth move quickly past the sensor, then the transmission clock frequency may be higher than when the teeth move more slowly past the sensor. The code elements, in this case the teeth and alternate gaps, may correspond exactly to the transmission clock pulses.

The method of the invention may advantageously employ a two-wire line as the transmission channel; in other words, no additional wire connections or terminals may be needed at the output of the sensing device for data transmission. In addition, data may be easily transmitted, using only two signal levels (in voltage or current mode).

The sensing device according to the invention for carrying out the above method may produce a data signal at the output terminals of the sensing device, wherein the transmission clock cycle of this signal may be a measure of the speed of the movable object that is detected by the sensor. The transmission clock cycle may be modulated with additional information.

A sensing device of this type may be produced, for example, as a monolithic integrated circuit. A sensing device of this type may be advantageously employed in automobiles for controlling an ABS (anti-lock braking system).

The method and the sensing device of the invention will now be described in greater detail with reference to embodiments shown in the figures.

DETAILED DESCRIPTION OF PREFERRED EMBODIMENT(S)

Figure 1:
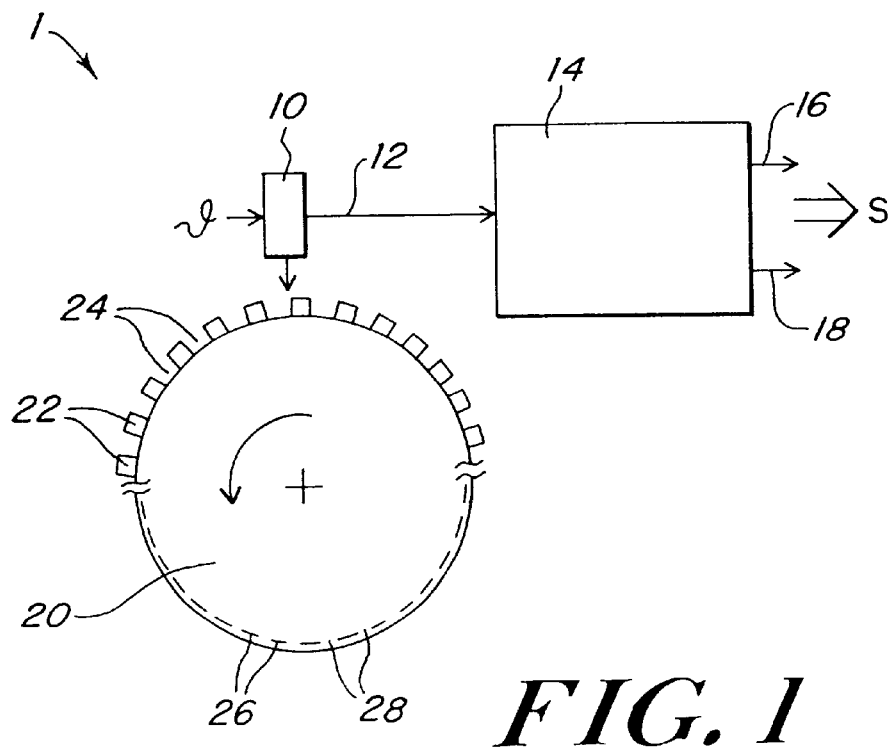
FIG. 1 is a schematic diagram of a sensing device according to the present invention for detecting the rotational speed of a wheel as well as additional information.

In the following figures, unless otherwise specified, the same reference numerals refer to identical parts, or to parts performing an identical function.

In FIG. 1, a sensing device 1 is shown schematically with a sensor 10 and electronic circuitry 14 connected to the sensor 10 by a wire 12. The Sensor 10 and the electronic circuitry 14 may be implemented, for example, as a monolithic integrated circuit. The sensor 10 may be an optical, magnetic, or inductive sensor.

In the following example, it will be assumed that the sensor 10 is a Hall sensor. The sensing device 1 has two output terminals 16, 18 that can be connected to a control device S.

The Sensor 10 is associated with a movable object, such as a gear 20, in this case a rotatable gear. A plurality of Teeth 22 are disposed at uniform intervals at an outer circumference of the gear 20, with a plurality of tooth gaps 24 provided between the teeth 22. The Hall sensor 10, during a rotary movement of the gear 20, detects the movement of the passing teeth 22 and the gaps 24. A time interval between two successive teeth 22 or gaps 24 is a direct measure of the speed of the gear 20.

Figure 4:
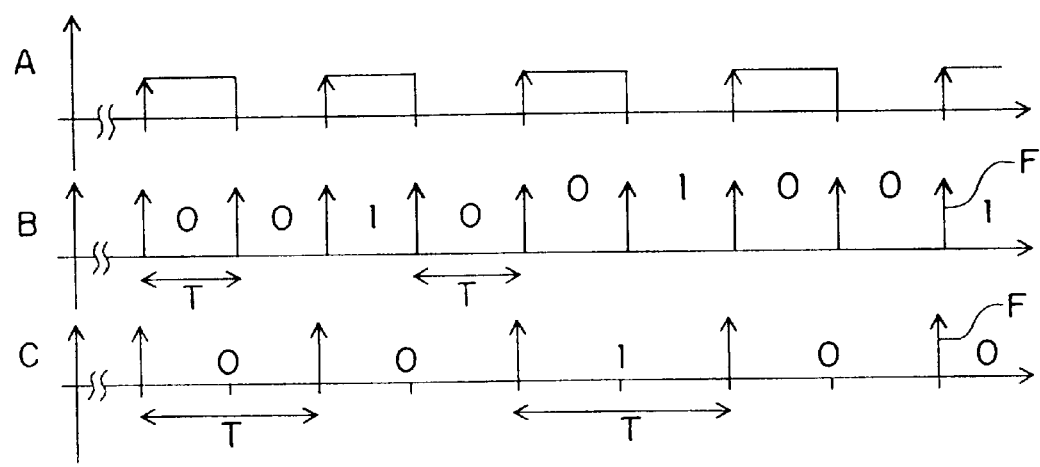
FIG. 4 is an exemplary clock signal of the sensing device of FIGS. 1 to 3 with associated trigger signals.

The electronic circuitry 14 evaluate the sensor signal of the sensor 10. The sensor signal is advantageously supplied to a threshold value discriminator to suppress noise in a fashion known to one of ordinary skill in the art. At the output of such a threshold value discriminator, which is not shown for sake of clarity, a signal is supplied which corresponds exactly to the passage of the teeth 22 and the gaps 24 of the gear 20. This signal is represented in FIG. 4 by a reference letter A. The signal A is used as the transmission clock signal for additional information provided by the sensor 10.

For example, data relating to the ambient temperature of the sensor 10, the switching behavior thereof, and also to the direction of rotation of the rotatable object 20 and any other parameters to be detected may be transmitted as additional information. In the following, it will be assumed that the additional information to be provided to the control device S is the ambient temperature ϑ of the sensor 10. The ambient temperature ϑ is detected in a conventional manner by, for example, by a temperature sensor (not shown), digitized, and provided to the output terminals 16, 18 of the sensing device for transmission in the form of a digital value.

In the present example, it is assumed that the digital value for the temperature is "001." Each individual data bit of this digital value "001" is transmitted in succession between each two edges of transmission cycle A, as shown in FIG. 4 in the reference to data transmission protocols B and C, respectively.

In the data transmission B shown in FIG. 4, the period duration T of transmission pulse A is determined by two consecutive edges, i.e., a rising edge followed immediately by a falling edge. At C, on the other hand, the trigger edges F of the transmission pulse are determined exclusively by the respective rising edges of the transmission pulse. Consequently, the length T of the transmission is twice as long as in the data transmission in B. Both versions may be implemented.

Referring back to FIG. 1, it is assumed in the discussion above that the sensor 10 is a Hall sensor that detects the alternate appearance of the teeth 22 and the gaps 24. Instead of a Hall sensor 10, however, an optical sensor may be employed which detects an optical marking disposed on, for example, the outer circumference of the gear 20 and derives from this a transmission clock signal that is advantageously directly proportional to the rotational speed of the gear 20. With the optical sensor 10, alternating black stripes and light stripes may be provided as code elements. Otherwise, the device functions in a manner similar to that described earlier.

Figure 2:
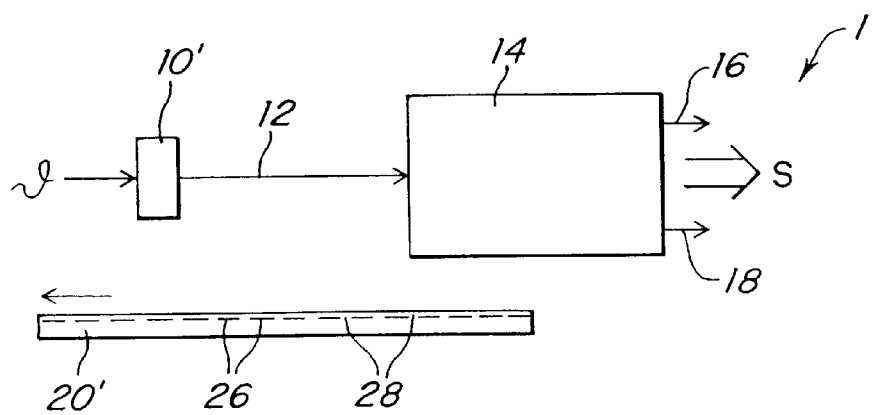
FIG. 2 shows the sensing device of FIG. 1 for detecting a linear movement of a rod provided with a bar code.
Figure 3:
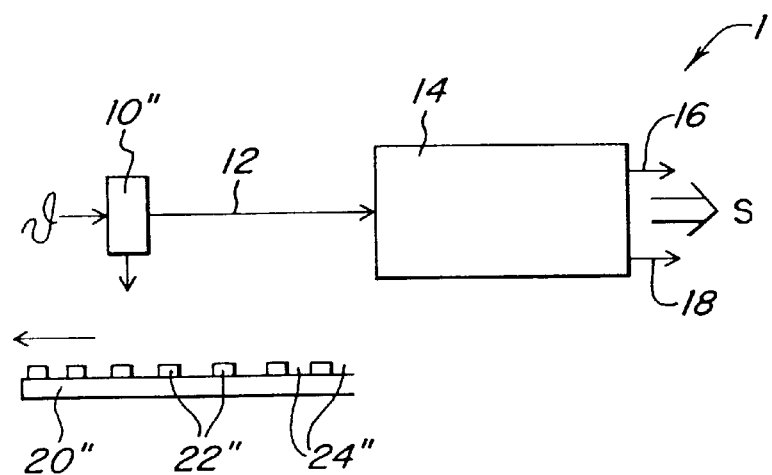
FIG. 3 shows the sensing device of FIGS. 1 and 2 for detecting the linear movement of a rack.

FIGS. 2 and 3 illustrate a sensing device such as that of FIG. 1. However, in the embodiment shown in FIG. 2, the sensor 10' is used to scan an optical code that consists of dark and light stripes 26, 28 applied, for example, to a top portion of a linearly moving object 20' and processed in a manner similar to that discussed above.

In the embodiment shown in FIG. 3, the sensor 10" may scan teeth 22" and gaps 24" of a movable rack 20".

Figure 5:
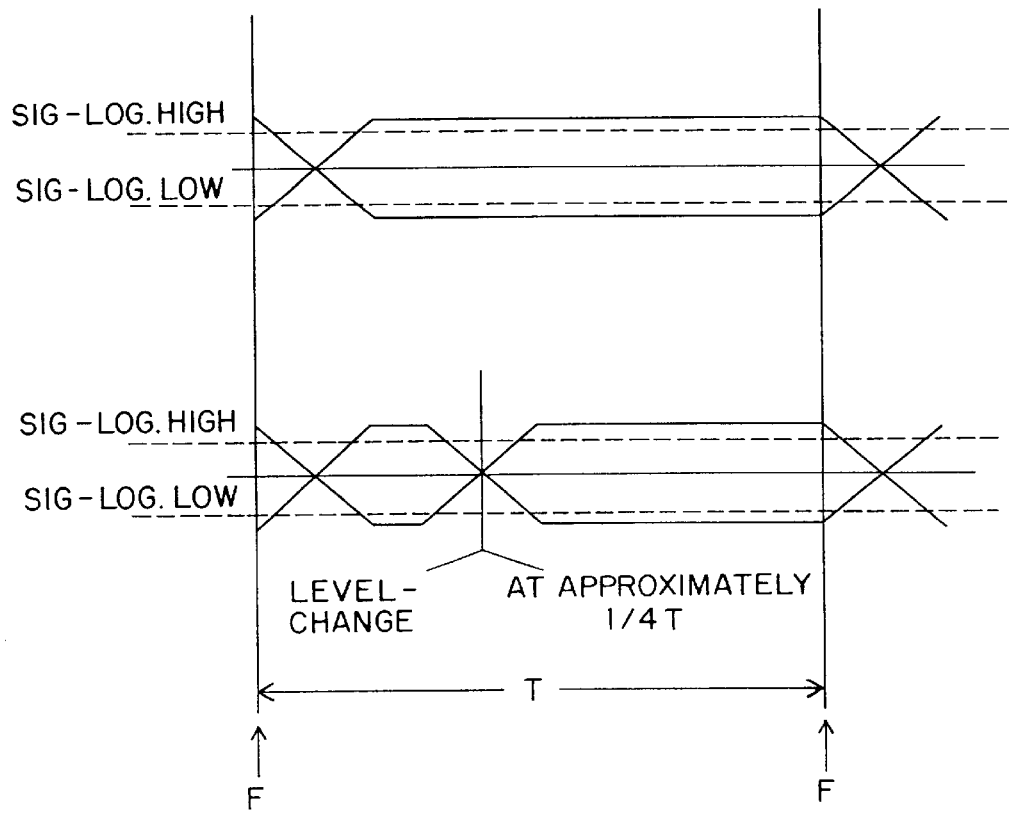
FIG. 5 shows a modulation of data bits between two edge-trigger signals.

FIG. 5 shows an exemplary data format for a logical "0" and logical "1" which may be produced between two successive trigger edges F. The logical "0" (shown in the top graph), for example, may be characterized by a single level change at the beginning between two successive trigger edges F. The attained level is retained for the remainder of the period T. The logical "1" (shown in the bottom graph) is characterized, for example, by another level change at a specific time within period T between two trigger edges F. In the embodiment shown in FIG. 5, this level change occurs at approximately 1/4 T. Other definitions of logical "0" and logical "1" may also be employed. The level change may occur at a different portion of the period T.

Figure 6:
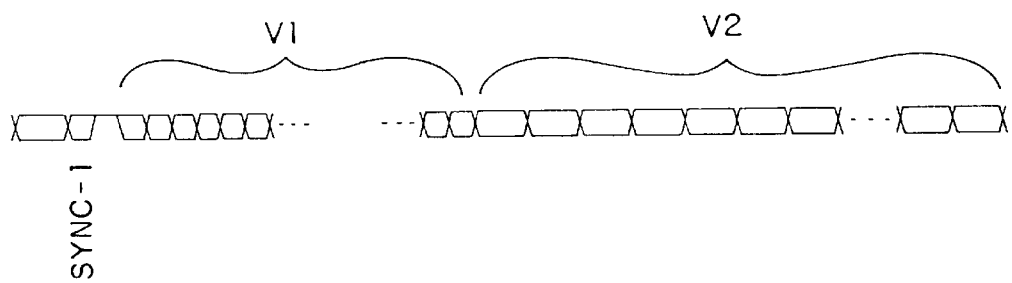
FIG. 6 is an exemplary data protocol for transmitting the speed information as well as additional data for different speeds of the movable object.

FIG. 6 shows an exemplary data protocol which can be supplied at the output terminals 16, 18 of the sensing device 1 if the speed of the movable object 20 decreases after a speed V1 has been detected. The slower speed is marked by V2. The beginning of the data transmission is defined by a synchronization signal or by synchronization bits SYNC-1. The synchronization bits are followed by a required number of data bits that can be followed by error correction bits. The individual bits, depending on the speed V1 or V2 of a movable object 20 detected by sensing device 1, can be supplied at the output terminals 16, 18 of the sensing device. If the speed of object 20 is reduced, then the individual data bits appear more slowly, as seen from the protocol in FIG. 6. The period T within which the individual data bits appear, is a direct measure of the speed of the moving object 20, and can be evaluated in a simple manner with a control device.

Although the movable objects 20 shown in FIGS. 1 and 3 were a rack and a toothed gear with teeth having rectangular cross-section, tooth edges with other shapes and cross-sections may also be employed.

What is claimed is:

1. Method for transmitting speed information detected by a sensing device concurrently with additional information over a common transmission channel, comprising:

selecting a transmission clock cycle as a function of the speed detected by the sensing device; and transmitting the additional information as a modulation of the transmission clock cycle,
wherein for transmitting said speed information and said additional information two different signal levels are used,
said speed information is determined by two consecutive edges of said transmission clock cycle, and
said additional information is digitized as level changes between said two consecutive edges.

2. The method of claim 1, wherein the modulation for the additional information is transmitted as a series of individual data bits located between predetermined trigger edges of the transmission clock cycle.

3. The method of claim 1, further comprising:
disposing code information on an object at regular intervals;
associating the sensing device with the object that is movable relative to the sensing device; and
determining the speed by scanning the sensing device.

4. The method of claim 1, further comprising:
disposing code information on a side of an object, wherein the side faces the sensing device.

5. The method of claim 4, wherein the object comprises a rotatable object selected from the group consisting of a disk and a wheel.

6. The method of claim 4, wherein the object performs a linear motion.

7. The method of claim 3, wherein the code information comprises alternating consecutive first and second code elements.

8. The method of claim 3, wherein sensing device forms from the scanned code information a digital signal with the sequence . . . 01010 . . . , and the speed of the movable object is calculated from the transmission clock cycle of the digital signal.

9. The method of claim 8, wherein the additional information is transmitted by modulating the transmission clock cycle with the digital signal.

10. The method of claim 1, wherein the additional information comprises a distance of the sensing device from a movable object.

11. The method of claim 1, wherein the additional information comprises an ambient temperature of the sensing device.

12. The method of claim 1, wherein the additional information comprises a direction of movement of an object.

13. The method of claim 1, wherein the additional information comprises a switching behavior of the sensing device.

14. The method of claim 1, wherein the transmission channel comprises an electrical connection.

15. Sensing device for providing a speed of a movable concurrently with additional data, comprising:
a sensor for detecting the speed of the object; and
output terminals for providing a data signal having a transmission clock cycle, wherein the transmission clock cycle is a measure of the speed detected by sensor and the transmission clock cycle is modulated by the additional data,
wherein two different signal levels are used to transmit said speed and said additional data,
said speed is determined by two consecutive edges of said transmission clock cycle, and
said additional data is digitized as level changes between said two consecutive edges.

16. The sensing device of claim 15, wherein the sensor is an optical, magnetic, or inductive sensor.

17. The sensing device of claim 15, wherein the additional data are supplied at the output terminals as individual data bits located between two trigger edges of transmission clock pulses.

18. Use of the sensing device of claim 15 in a motor vehicle for detecting the rotary movement of disks or gears operatively connected to an antilock braking system.

19. Method for transmitting speed information, comprising:
selecting a transmission clock cycle as a function of speed detected by a sensing device; and
transmitting additional information as a modulation of the transmission clock cycle,
wherein for transmitting said speed information and said additional information two different signal levels are used,
said speed information is determined by two consecutive edges of said transmission clock cycle, and
said additional information is digitized as level changes between said two consecutive edges.

20. The method of claim 19, wherein the modulation for the additional information is transmitted as a series of individual data bits located between predetermined trigger edges of the transmission clock cycle.

21. The method of claim 19, further comprising:
disposing code information on an object at regular intervals;
moving the object relative to the sensing device; and
determining the speed by scanning the sensing device.

22. The method of claim 21, wherein the code information comprises alternating consecutive first and second code elements.

23. The method of claim 21, wherein sensing device forms a digital signal sequence having alternating 1's and 0', and the speed of the movable object is calculated from the transmission clock cycle of the digital signal.

24. The method of claim 23, wherein the additional information is transmitted by modulating the transmission clock cycle with the digital signal.

25. Sensing device, comprising:
a sensor for detecting a speed of an object;
at least one output terminal, coupled to the sensor, that provides a data signal having a transmission clock cycle that is a measure of the speed detected by sensor, the transmission clock cycle being modulated by additional data,
wherein two different signal levels are used to transmit said speed and said additional data,
said speed is determined by two consecutive edges of said transmission clock cycle, and
said additional data is digitized as level changes between said two consecutive edges.

26. The sensing device of claim 25, wherein the sensor is an optical, magnetic, or inductive sensor.

27. The sensing device of claim 25, wherein the additional data is supplied at the output terminals as individual data bits located between two trigger edges of transmission clock pulses.

* * * * *